US011380313B2

(12) United States Patent
Eck et al.

(10) Patent No.: US 11,380,313 B2
(45) Date of Patent: *Jul. 5, 2022

(54) VOICE-BASED CONTROL IN A MEDIA SYSTEM OR OTHER VOICE-CONTROLLABLE SOUND GENERATING SYSTEM

(71) Applicant: Microchip Technology Incorporated, Chandler, AZ (US)

(72) Inventors: Arthur Eck, Gilbert, AZ (US); Devon Stephens, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/749,372

(22) Filed: Jan. 22, 2020

(65) Prior Publication Data

US 2020/0160855 A1 May 21, 2020

Related U.S. Application Data

(63) Continuation of application No. 15/962,011, filed on Apr. 25, 2018, now Pat. No. 10,580,402.

(Continued)

(51) Int. Cl.
*G10L 15/20* (2006.01)
*G10L 21/0272* (2013.01)
(Continued)

(52) U.S. Cl.
CPC .......... *G10L 15/20* (2013.01); *G10L 21/0208* (2013.01); *G10L 21/0272* (2013.01);
(Continued)

(58) Field of Classification Search
USPC .......................... 704/231, 233, 270–271, 275
See application file for complete search history.

(56) References Cited

U.S. PATENT DOCUMENTS 10,185,391 B2   1/2019  Lee et al.
2011/0065392 A1*  3/2011  Chung ................... H04B 17/21
                                              455/67.11
(Continued)

OTHER PUBLICATIONS

Shynk, John J., "Frequency-Domain and Multirate Adaptive Filtering," IEEE Signal Processing Magazine, vol. 9, Issue 1, pp. 14-37, dated Jan. 1992.

(Continued)

*Primary Examiner* — Leonard Saint Cyr
(74) *Attorney, Agent, or Firm* — Slayden Grubert Beard PLLC

(57) ABSTRACT

A system for enhanced processing of voice-based signals in a voice-controllable sound-generating system (SGS) is provided. An SGS audio source may communicate electronic SGS audio signals to both (a) one or more speakers, which output corresponding SGS sound waves and (b) an audio countering system. A microphone may detect sound waves and output corresponding audio signals including: (a) distorted SGS audio signals corresponding with SGS sound waves and (b) additional audio signals originated from other sources, e.g., including voice-based commands. The audio countering system may (a) receive the electronic SGS audio signals from the SGS audio source; receive signals from the microphone representing the microphone-detected sound waves, and (c) use the electronic SGS audio signals received to cancel or counter the distorted SGS audio signals included in the microphone-received audio signals, to thereby enhance any voice-based commands included in the received audio signals.

20 Claims, 6 Drawing Sheets

Related U.S. Application Data

(60) Provisional application No. 62/491,018, filed on Apr. 27, 2017.

(51) Int. Cl.
  *G10L 21/0208* (2013.01)
  *G10L 21/055* (2013.01)
  *H04S 7/00* (2006.01)

(52) U.S. Cl.
  CPC ............ *G10L 21/055* (2013.01); *H04S 7/301* (2013.01); *G10L 2021/02082* (2013.01); *H04R 2227/009* (2013.01); *H04R 2430/23* (2013.01)

(56) References Cited

U.S. PATENT DOCUMENTS

| | | | |
|---|---|---|---|
| 2011/0178798 A1 | 7/2011 | Flaks et al. | 704/226 |
| 2011/0185389 A1 | 7/2011 | Braithwaite et al. | 725/74 |
| 2014/0003611 A1 | 1/2014 | Mohammad et al. | 381/66 |
| 2014/0349638 A1 | 11/2014 | Umezawa et al. | 455/419 |
| 2016/0021473 A1* | 1/2016 | Riggi | H04R 3/00 381/59 |
| 2016/0171964 A1 | 6/2016 | Kim et al. | 381/71.11 |
| 2016/0217795 A1 | 7/2016 | Lee et al. | 704/244 |
| 2016/0309276 A1* | 10/2016 | Ridihalgh | H04S 5/005 |
| 2017/0013304 A1 | 1/2017 | Braithwaite et al. | 725/74 |
| 2017/0110106 A1* | 4/2017 | Kumar | H04R 29/00 |
| 2017/0301336 A1* | 10/2017 | Kumar | G10K 11/17813 |
| 2018/0315421 A1 | 11/2018 | Eck et al. | |

OTHER PUBLICATIONS

International Search Report and Written Opinion, Application No. PCT/US2018/029497, 11 pages, dated Jun. 19, 2018.

* cited by examiner

VOICE-BASED CONTROL IN A MEDIA SYSTEM OR OTHER VOICE-CONTROLLABLE SOUND GENERATING SYSTEM

RELATED PATENT APPLICATION

This application is a Continuation of U.S. Non-Provisional patent application Ser. No. 15/962,011, filed on Apr. 25, 2018, and claims priority to commonly owned U.S. Provisional Patent Application No. 62/491,018 filed Apr. 27, 2017, which are hereby incorporated by reference in their entirety for all purposes.

TECHNICAL FIELD

The present disclosure relates to voice control of a system or device, and more particularly, for improved voice control of a system or device that generates sounds.

BACKGROUND

A growing number of systems are configured for voice-based control, or voice command, of one or more aspects of such systems. These systems may be referred to voice-controllable systems. A voice-controllable system may allow a user to easily control aspects of the system operation in a hands-free manner. Some example voice-controllable systems include home appliances, mobile phones (e.g., for voice-based dialing, texting, web browsing, etc.), media systems (e.g., TV, stereos, etc.), computer operating systems, commercial software for computers, internet search engines, vehicles, and call centers. Voice control has improved in recent years due to substantial advancements in voice recognition, e.g., based on the advancement of deep learning generated algorithms and the development of graphics processing units (GPUs) that allow accelerated processing of voice recognition algorithms.

However, for voice-controllable systems that also generate sound, such as certain TVs and other entertainment systems, mobile phone, computers, blue tooth speakers, etc., referred to herein as voice-controllable sound generating systems (SGS), the effectiveness of the voice-recognition system may be lessened by the fact that audio output by the voice-controllable SGS mixes with voice command audio, and may thus mask or make the voice audio difficult to identify.

SUMMARY

Embodiments of the present disclosure provide systems and methods for improving voice-based control of a voice-controllable sound generating system (SGS) by cancelling or otherwise countering sounds output by a sound source associated with the voice-controllable sound generating system. As used herein, a voice-controllable sound generating system includes any system that (a) generates sounds and (b) is configured for voice-based control of one or more functions of the system. Example voice-controllable sound generating systems include certain entertainment or media systems (e.g., a voice-controllable TV, stereo system, smartphone, laptop computer, tablet computer, desktop computer, etc.), blue tooth speakers, intercom systems, etc.

Some embodiments provide an audio countering system configured to obtain and use electronic system-based audio signals communicated by an audio source of the voice-controllable sound generating system to counter corresponding system-based audio signals received at a voice-control microphone, after being influenced by the surrounding physical environment and/or other distortion factors. By cancelling or countering the audio output by the sound generating system and received at the microphone, the audio countering system can effectively isolate or enhance a voice-based signal received at the microphone simultaneous with the sounds waves output by the sound generating system. A voice control system may then analyze the resulting audio signals, with the enhanced voice-based signal (resulting from the cancellation/countering of the sound generating system audio) to identify voice commands for the voice-controllable sound generating system, which may then be implemented.

In one embodiment, the system may use the same digital source to null, counterbalance, cancel, or compensate for the microphone to the sounds generated by the device. This may be performed in the digital domain. Furthermore, the system may compensate for system volume, speaker aberrations or anomalies, proximity to speaker, reflections, or echoes. In another embodiment, the system may use the digital source to compensate in the analog domain. For example, the digital source may be converted from analog to digital, the phase inversion may be matched, and gain or attenuation may be applied. In yet another embodiment, an analog source could be converted to the digital domain and compensated-for in the digital domain. In still yet another embodiment, an analog source could be used by matched phase inversion and attenuated or gain applied as-needed.

The system may include a digital or analog sound source. The output of the sound source may be amplified with a specified gain to the speaker. In parallel, the output of the sound source may be routed to a digital or analog compensation circuit. The compensation circuit may also have input from a system microphone, into which voice-activated commands are entered. The compensation circuit may perform, in the digital or analog domain as described above, compensation for the output of the sound source in the input from the microphone. A delay may be accounted-for, wherein the sound source may have taken an amount of time to reach the microphone after leaving the speaker. The compensated signal may be interpreted by the rest of the system, in which voice-activated commands are scanned-for and recognized.

In order to compensate for sound-making devices, the system may first perform a calibration mode. In the calibration mode, an available or desired audio frequency band sweep may be performed, wherein the sound source goes through such a sweep to determine ambient conditions of input for the microphone. Through such a process, expected delay, echo, and other signal aspects may be characterized. This characterization information may be used in subsequent operating modes to compensate-for the sound source during operation and detection of voice commands.

BRIEF DESCRIPTION OF THE DRAWINGS

Example aspects of the present disclosure are described below in conjunction with the figures, in which.

DETAILED DESCRIPTION

Figure 1:
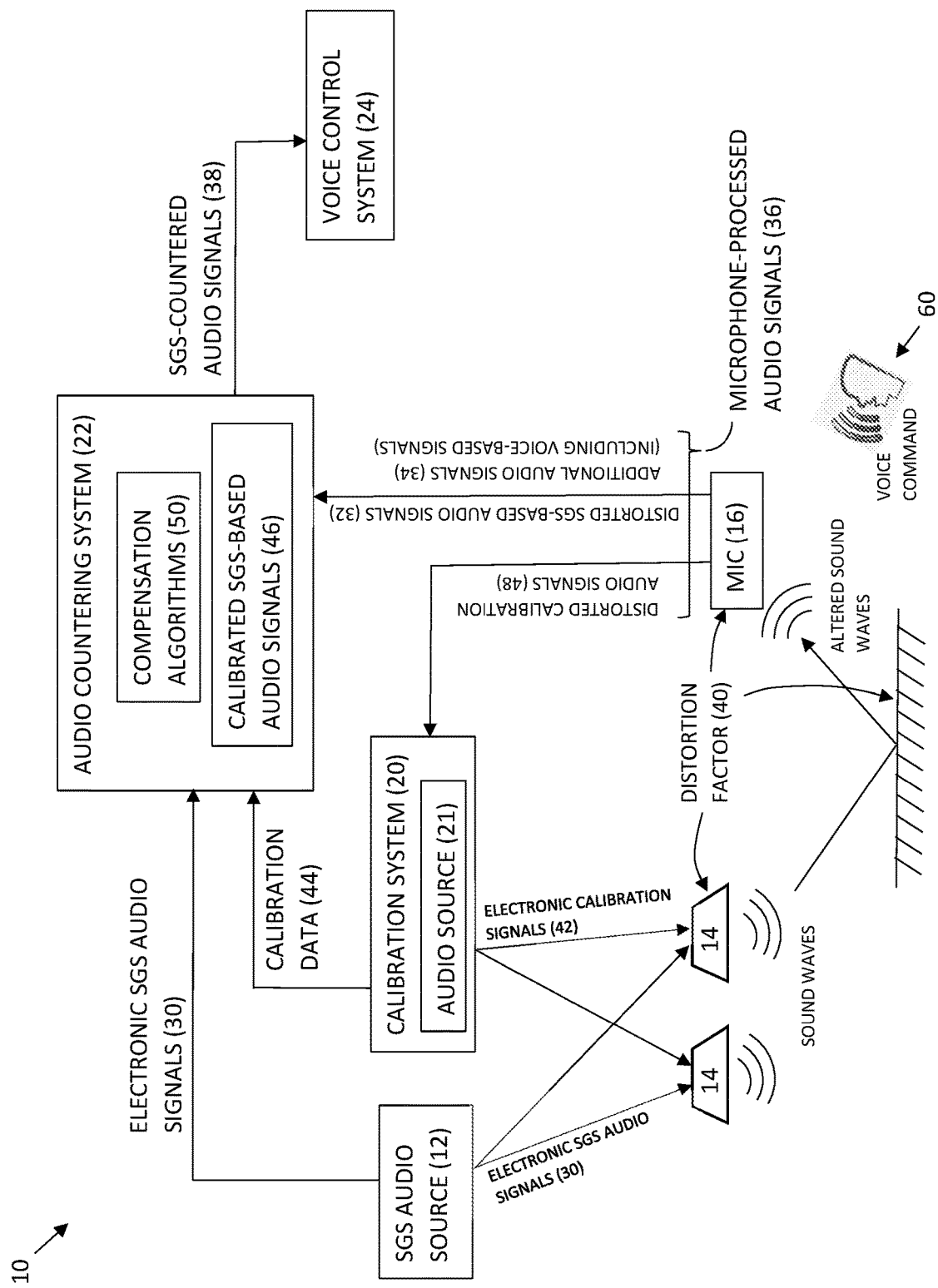
FIG. 1 illustrates an example system for cancelling or otherwise countering the audio output by a voice-controllable sound generating system (e.g., a voice-controllable media system) to enhance the identification of voice commands from a user, according to embodiments of the present invention.

Embodiments of the present disclosure provide systems and methods for improving voice-based control of a voice-controllable sound generating system (e.g., a voice-controllable entertainment system, TV, stereo system, smartphone, computer, blue tooth speaker, intercom system, etc.) by cancelling or otherwise countering sounds output by a sound source associated with the voice-controllable sound generating system.

A voice-controllable sound generating system may include a sound generating system (SGS) audio source that generates and/or communicates Electronic SGS audio signals for output by speaker(s) as sound waves, and a voice-control microphone intended to receive voice-based audio including voice commands for controlling various functions of the sound generating system (e.g., power, operating mode, volume, channel, media playback functions, system settings, etc.). However, the voice-control microphone may also inherently receive SGS-based sound waves output by the speaker(s) and/or additional sound waves from other sources, which may distort or conceal the voice audio and thus complicate the accurate identification of the voice commands from the audio received at the microphone.

Thus, some embodiments provide an audio countering system configured to obtain and use the Electronic SGS audio signals communicated by the SGS audio source (the same electronic audio signals that are communicated to and output by the speakers as SGS-based sound waves) to counter the SGS-based audio received at the voice-control microphone (after being influenced by the surrounding physical environment and/or other distortion factors). For example, the audio countering system may use the electronic SGS audio signals to generate SGS audio-countering signals calculated to cancel or otherwise counter the SGS-based audio received via the microphone. By cancelling or countering the SGS-based audio received via the microphone, the audio countering system can effectively isolate or enhance a voice-based audio signal from a combined audio signal—including the voice-based audio signal and the SGS-based audio-received at the microphone. The audio countering system can then communicate the SGS audio-countered audio signal (including the isolated or enhanced voice-based audio signal) to a voice control system, which may identify voice commands from the SGS audio-countered audio signal, and implement the control functions associated with the identified voice commands.

The audio countering system may be integrated in or separate from the sound generating system, according to the particular embodiment.

Some embodiments include a calibration system configured to modify (calibrate) the Electronic SGS audio signals used by the audio countering system to cancel or otherwise counter the SGS-based audio received via the microphone, in particular to account for the influence of distortion factors on the SGS-based audio, e.g., time delay and signal distortion caused by the transmission, reflection, absorption, diffusion, etc. of sound waves. Distortion factors are discussed in more detail below with reference to FIG. 1.

The calibration system may be configured to output calibration audio signals via one or more speakers, receive calibration sound waves via the microphone, and determine calibration data that characterizes the influence of distortion factors on the calibration audio signals. The audio countering system may use the calibration data for countering SGS-based audio signals output via speakers and received at the voice-control microphone, in particular to compensate for distortion factors that influence the SGS-based audio signals.

The calibration audio source may be the SGS audio source or a separate calibration audio source. Further, the calibration audio signals may comprise portion(s) of the SGS-based audio signals generated by the SGS audio source, or may be integrated in or combined with SGS-based audio signals generated by the SGS audio source, or may be output separate from the output of SGS-based audio signals (e.g., during a defined calibration process), or otherwise generated and output.

Other embodiments may omit the calibration system.

Various embodiments may be configured for one or more of the following types of sound countering:

1. "Digital-digital sound-countering": Digital countering of digital signals. For example, using electronic SGS-based audio signals generated by a digital SGS audio source to counter digital SGS-based audio signals (e.g., audio signals received at a voice-control microphone and passed through an analog-to-digital (ADC) converter).

2. "Digital-analog sound-countering": Digital countering of analog signals. For example, using electronic SGS-based audio signals generated by a digital SGS audio source to counter analog SGS-based audio signals received at a voice-control microphone.

3. "Analog-analog sound-countering": Analog countering of analog signals. For example, using electronic SGS-based audio signals generated by an analog SGS audio source to counter analog SGS-based audio signals received at a voice-control microphone.

4. "Analog-digital sound-countering": Analog countering of digital signals. For example, using electronic SGS-based audio signals generated by an analog SGS audio source to counter digital SGS-based audio signals (e.g., audio signals received at a voice-control microphone and passed through an analog-to-digital (ADC) converter).

FIG. 1 illustrates an example system 10 for cancelling or otherwise countering the audio output by a voice-controllable sound generating system (e.g., a voice-controlled media system) to enhance the identification of voice commands from a user, according to embodiments of the present invention. The voice-controllable sound generating system (SGS) may comprise a TV, a stereo system, a smartphone, laptop computer, tablet computer, desktop computer, or any other system configured to output SGS-based sounds, receive voice-based commands (e.g., via a microphone), and control one or more aspects of the voice-controllable sound generating system based on the voice-based commands.

As shown in FIG. 1, example system 10 may include a sound generating system (SGS) audio source 12, one or more speakers 14, a microphone 16, a calibration system 20, an audio countering system 22, and a voice control system 24. SGS audio source may comprise any circuits and other electronics configured to communicate Electronic SGS audio signals 30 (analog or digital) to one or more speakers 14, which may output the signals 30 as SGS-based sound waves (e.g., into a room or an outdoor environment). In some embodiments, SGS audio source may generate and communicate the Electronic SGS audio signals 30 (analog or digital) for output by speaker(s) 14 as SGS-based sound waves. In other embodiments, SGS audio source may act as a pass-through or relay to communicate Electronic SGS audio signals 30 received from another source to speaker(s) 14.

The SGS-based sound waves output by speaker(s) 14 may be received by microphone 16, converted to electronic signals (analog or digital), and communicated to audio countering system 22. The SGS-based audio signals may be influenced by one or more distortion factors 40 (e.g., sound wave reflections due to the respective room and/or other physical objects), as discussed below in more detail. Thus, the SGS-based electronic signals communicated by microphone 16 to audio countering system 22 are referred to as distorted SGS-based audio signals 32.

Microphone 16 may receive sound waves from any number of audio sources, including SGS-based sound waves discussed above, voice-based sound waves (which may include voice commands) from one or more persons 60, and/or other sound waves from other source(s). Microphone 16 may convert or otherwise process the combined audio signals to generate microphone-processed audio signals 36 (analog or digital), which may include (a) distorted SGS-based audio signals 32 corresponding with received SGS-based sound waves, and (b) additional audio signals 34 including voice-based signals corresponding with received voice-based sound waves and any other signals corresponding with sound waves received from any other source.

In some embodiments, in addition to communicating Electronic SGS audio signals 30 for output by speaker(s) 14 as sound waves, SGS audio source may also communicate the same Electronic SGS audio signals 30 to audio countering system 22. Audio countering system 22 may use the Electronic SGS audio signals 30 received from SGS audio source to counter the distorted SGS-based audio signals 32 (based on the same Electronic SGS audio signals 30) received from microphone 16, to thereby help isolate or enhance voice-based audio signals in the combined microphone-processed audio signals 36.

Audio countering system 22 may include any circuits and/or other electronics configured to use Electronic SGS audio signals 30 received from SGS audio source to cancel or otherwise counter distorted SGS-based audio signals 32 received via microphone 16, e.g., to improve the detection of human voice commands within the additional audio signals 34 received via microphone 16. When a person speaks a voice command for a selected function associated with system 10 while speaker(s) 14 are outputting SGS-based sound waves, microphone 16 receives combined sound waves and generates a combined audio signal 36 including distorted SGS-based audio signals 32 combined with voice-based audio signals 34 and/or other audio signals.

Audio countering system 22 may use electronic SGS audio signals 30 (which may or may not be modified/ calibrated based on calibration data 44 provided by a calibration system 20, as discussed below) to counter the distorted SGS-based audio signals 32 within the combined audio signal 36 received from microphone 16, to generate SGS-countered audio signals 38, which may substantially isolate or enhance the voice-based audio signals (digital or analog) from the combined audio signal 36 received from microphone 16. Audio countering system 22 may then communicate the SGS-countered audio signals 38 to voice control system 24, which may analyze the signals 38 to identify one or more voice commands, and implement or communicate with a respective control system to implement the identified voice command(s) for selected function(s) associated with system 10.

In some embodiments, audio countering system 22 may modify the Electronic SGS audio signals 30 received from SGS audio source based on calibration data 44 calculated by calibration system 20, and use the modified (calibrated) Electronic SGS audio signals 46 to cancel or counter the distorted SGS-based audio signals 32 received via microphone 16. For example, audio countering system 22 may use calibration data 44 calculated by calibration system 20 to calibrate the Electronic SGS audio signals 30 to better match the distorted SGS-based audio signals 32 to be countered. Thus, the calibration data 44 may be configured to account for the influence of distortion factors 40 on the SGS-based audio signals, e.g., at any point(s) along the course from the communication of the electronic SGS audio signals 30 from SGS audio source, through the transmission and detection of corresponding SGS-based sound waves (from the system speaker(s) 14, through a physical environment, and to microphone 16), and to the communication of distorted SGS-based audio signals 32 to audio countering system 22 for processing.

Calibration system 20 may include a calibration audio source 21 configured to generate and output calibration audio signals 42 (analog or digital) to speaker(s) 14 for output as sound waves. The calibration sound waves may be received at microphone 16 and converted to distorted calibration audio signals 48 (analog or digital), which may be communicated to calibration system 20 for processing. Distorted calibration audio signals 48 represent calibration audio signals 42 after being influenced or "distorted" by distortion factors 40. Calibration audio signals 42 may include any audio signals (human-audible or human-inaudible) that may be used for such system calibration. For example, calibration audio signals 42 may include white noise signals output at various volumes to define baseline compensation variables for spatial aberrations of the listening space and system performance.

Calibration system 20 may analyze the distorted calibration audio signals 48 (e.g., in comparison to the corresponding calibration audio signals 42) using any suitable algorithms to determine calibration data 44 that characterizes the influence of distortion factor(s) 40 on the calibration audio signals 42. As discussed above, audio countering unit 22 may use the calibration data 44 for countering distorted SGS-based audio signals 32 communicated by microphone 16. For example, audio countering unit 22 may apply the calibration data 44 to Electronic SGS audio signals 30 generated by SGS audio source to generate calibrated SGS-based audio signals 46 that may be are used to counter the distorted SGS-based audio signals 32 received from microphone 16.

In some embodiments, calibration audio signals 42 may include sync signals, which may be used to measure the delay between (a) electronic SGS audio signals 30 being received at audio countering system 22 from SGS audio source 12 and (b) the resulting distorted SGS-based audio signals 32 received at audio countering system 22 via microphone 16, such that the earlier-received electronic SGS audio signals 30 may be time-shifted by the appropriate time period for countering the later-received distorted SGS-based audio signals 32. Synch signals 42 may include any sound signals, at any volume and frequency or frequencies (human-audible or human-inaudible) that can be detected by microphone 16 and identified by calibration system 20 or audio countering system 22. In some embodiments, sync signals may be output using a spread-spectrum approach in the audio domain.

As used herein, "distortion factors" may include any factors that distort or otherwise influence any type of audio signals (e.g., SGS-based audio signals, calibration audio signals, etc.), while in the form of electronic signals (e.g., being communicated between different components of system 10) or in the form of sound waves (e.g., between being output by speaker(s) and being received at a microphone). For example, distortion factors may include transmission effects on audio signals from a respective sound source (e.g., SGS audio source or calibration audio source) to one or more speaker(s), effects imparted by the speaker(s) themselves, acoustic effects from the surrounding physical environment (e.g., walls, furniture, or other physical structures), acoustic effects from interaction between sound waves from multiple speakers, effects imparted by the microphone itself (e.g., associated with collection and/or processing of audio signals), and/or any other distortion factors that may impart an influence on the respective audio signals (e.g., SGS-based audio signals or calibration audio signals).

In other embodiments, audio countering system 22 is configured to cancel or counter the distorted SGS-based audio signals 32 without calibrating the Electronic SGS audio signals 30, and may thus omit calibration system 20.

In addition, audio countering system 22 may include any circuits and/or other electronics configured to provide any one or more of the following types of sound-countering defined above: (1) digital-digital sound-countering, (2) digital-analog sound-countering, (3) analog-analog sound-countering, and/or (4) analog-digital sound-countering.

Figure 2:
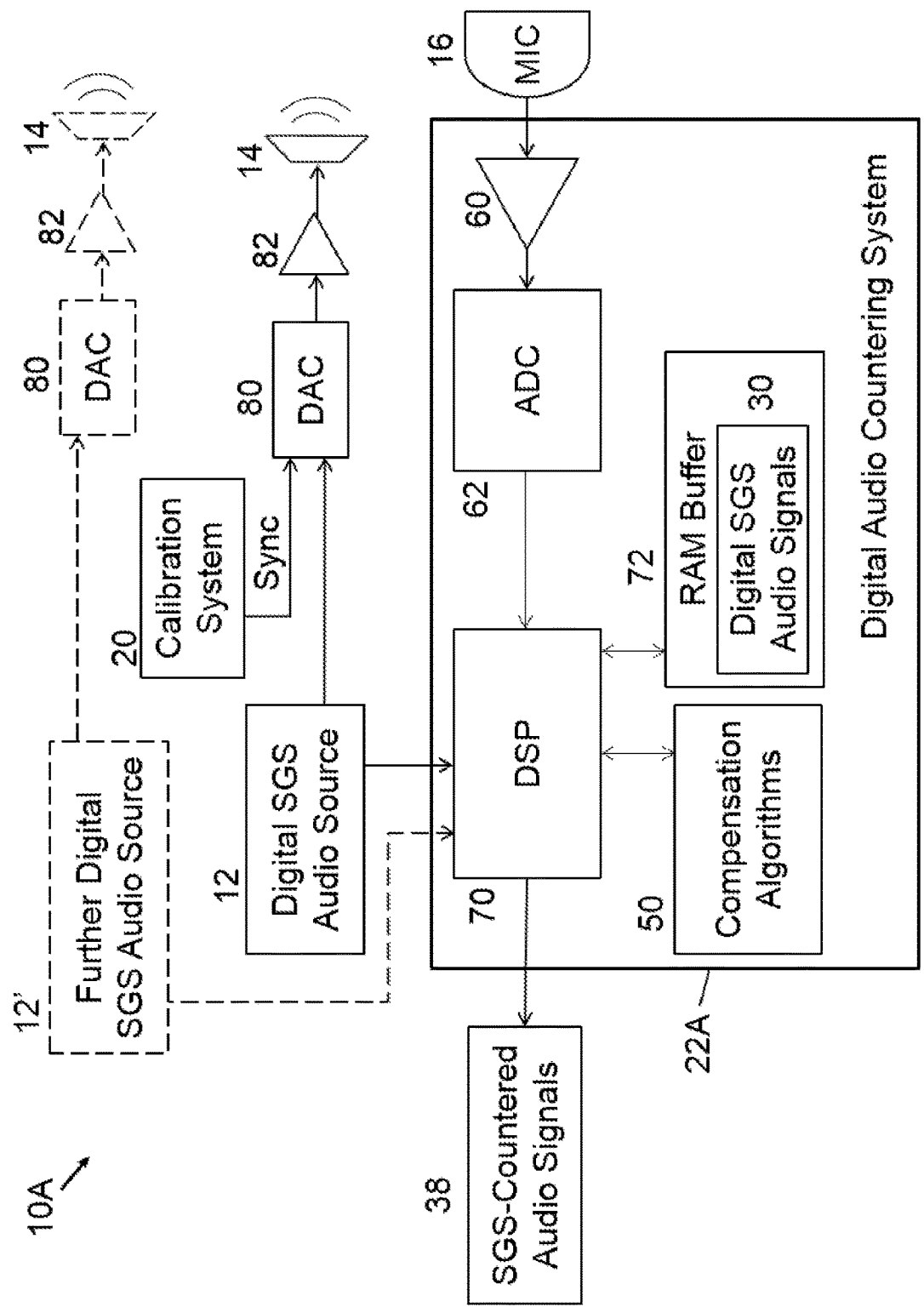
FIG. 2 illustrates an example sound compensation system for a digital voice-controllable sound generating system, with synchronization signaling, according to one embodiment.

FIG. 2 illustrates components of an example sound compensation system 10A for a digital voice-controllable sound generating system (SGS), with synchronization signaling, according to one example embodiment of system 10 shown in FIG. 1. System 10A may include a digital SGS audio source 12 configured to output digital SGS audio signals 30 for output via speaker(s) 14, e.g., after passing through a digital-to-analog converter 80 and amplifier 82. In addition, digital SGS audio source 12 may communicate the same digital SGS audio signals 30 to a digital audio countering system 22A, which uses the SGS audio signals 30 to counter (distorted and time-shifted) audio signals received via microphone 16, e.g., as discussed above regarding FIG. 1.

In some embodiments, the system may include multiple digital SGS audio sources simultaneously outputting different sounds. Thus, as shown in FIG. 2, at least one further digital SGS audio source 12' may generate digital SGS audio signals for output via speaker(s) 14', e.g., after passing through a digital-to-analog converter 80' and amplifier 82'. In addition, each further digital SGS audio source 12' may communicate its digital SGS audio signals to digital audio countering system 22A, which may use the SGS audio signals from the multiple SGS audio sources 12, 12' to counter audio signals received via microphone 16.

System 10A may include a calibration system 20 configured to generate and output synchronization or calibration signals 42, e.g., at defined intervals or based on defined triggering events. In the illustrated example, calibration system 20 outputs synchronization ("sync") signals 42 via the same speaker(s) 14 as the audio from digital SGS audio source 12. Synch signals 42 may include any sound signals (within or outside the typical human-audible frequency spectrum) that can be detected by microphone 16 and identified by DSP 70.

Digital audio countering system 22A may include an amplifier 60, an analog-to-digital converter (ADC) 62, a digital signal processor (DSP) 70, a memory buffer (e.g., RAM), and one or more compensation algorithms 50, along with any other hardware and/or software/firmware components for performing sound countering functionality. DSP 70 may be configured to receive (a) digital SGS audio signals 30 from digital SGS audio source 12 (and/or at least one further digital SGS audio source 12') and (b) microphone-processed audio signals 36 received via microphone 16, e.g., after passing through amp 60 and ADC 62. Microphone-processed audio signals 36 may include audio signals originating from various sources and distorted by various distortion factors 40, as discussed above regarding FIG. 1. For example, microphone-processed audio signals 36 may include combination of (a) distorted SGS-based audio signals 32 corresponding with digital SGS audio signals 30, (b) distorted sync signals 48 corresponding with synch signals 42, and/or (c) additional audio signals 34 including voice-based sound signals.

DSP 70 may be configured to use digital SGS audio signals 30, which may be time-shifted or synchronized based on received sync signals 48, to counter the distorted SGS-based audio signals 32 within the combined audio signal 36 received from microphone 16, to generate SGS-countered audio signals 38, which may substantially isolate or enhance any voice-based audio signals received via microphone 16. DSP 70 may be configured to execute any suitable audio compensation algorithms 50 for generating SGS-countered audio signals 38. For example, DSP 70 may be configured to execute an adaptive filter according to any known or suitable active noise cancellation algorithms or routines, e.g., embodied as a known or suitable frequency-domain adaptive filter configured to efficiently process discrete-time signals using block and multi-rate adaptive filtering, e.g., as disclosed in the article "Frequency-domain and multirate adaptive filtering" by J. J. Shynk, *IEEE Signal Processing Magazine*, Vol. 9, Issue 1, January 1992 (pp. 14-37).

In some embodiments, DSP 70 may utilize a memory buffer (e.g., RAM) 72 to temporarily store (buffer) digital SGS audio signals 30 from digital SGS audio source 12 (or multiple digital SGS audio sources 12, 12'), to use the digital SGS audio signals 30 for countering the corresponding distorted and time-shifted (delayed) SGS-based audio signals 32 received via microphone 16. DSP 70 may determine the appropriate duration for time-shifting the (earlier-received) digital SGS audio signals 30 to counter the corresponding (later-received) distorted SGS-based audio signals 32 based on the timing of distorted sync signals 48 received from microphone 16 and clock-based timing of the output of synch signals 42 from calibration system 20. System 10A may recalibrate this time-shifting delay at any suitable interval or upon any defined triggering event).

Figure 3:
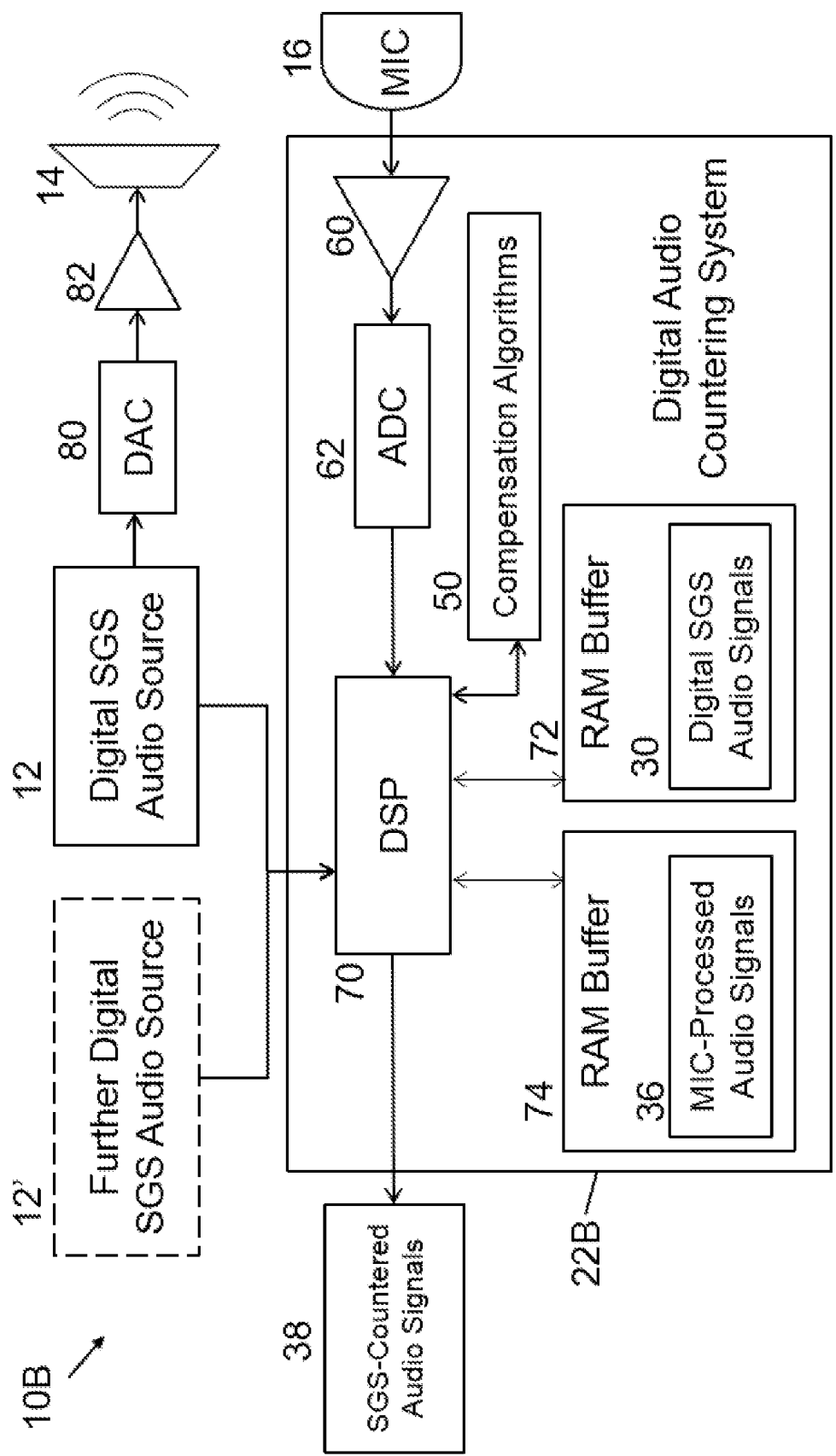
FIG. 3 illustrates an example sound compensation system for a digital voice-controllable sound generating system, without synchronization signaling, according to one embodiment.

FIG. 3 illustrates components of an example sound compensation system 10B for a digital voice-controllable sound generating system, without synchronization signaling, according to one example embodiment of system 10 shown in FIG. 1.

System 10B may be generally similar to system 10A shown in FIG. 2, but may be configured to synchronize the use of digital SGS audio signals 30 received from SGS audio source 30 to counter the resulting (later-received) distorted SGS-based audio signals 32 without the use of discrete sync signals 42.

In some embodiments, the digital audio countering system 22B of system 10B may include (a) a first memory buffer (e.g., RAM) 72 for storing or buffering digital SGS audio signals 30 from digital SGS audio source 12 (or multiple digital SGS audio sources 12, 12') and a second memory buffer (e.g., RAM) 74 for storing or buffering SGS-based audio signals 32 received via microphone 16. DSP 70 may analyze the details of the respective audio signals stored in buffers 72 and 74 to identify elements of distorted SGS-based audio signals 32 that match the corresponding digital SGS audio signals 30, and determine the associated delay between the two signals based on the identified matching signal elements. DSP 70 may then use this determined delay to time-shift digital SGS audio signals 30 to counter the corresponding (later-received) distorted SGS-based audio signals 32. System 10A may perform such time-shift calibration continuously, or at any suitable interval, or upon any defined triggering event.

Figure 4:
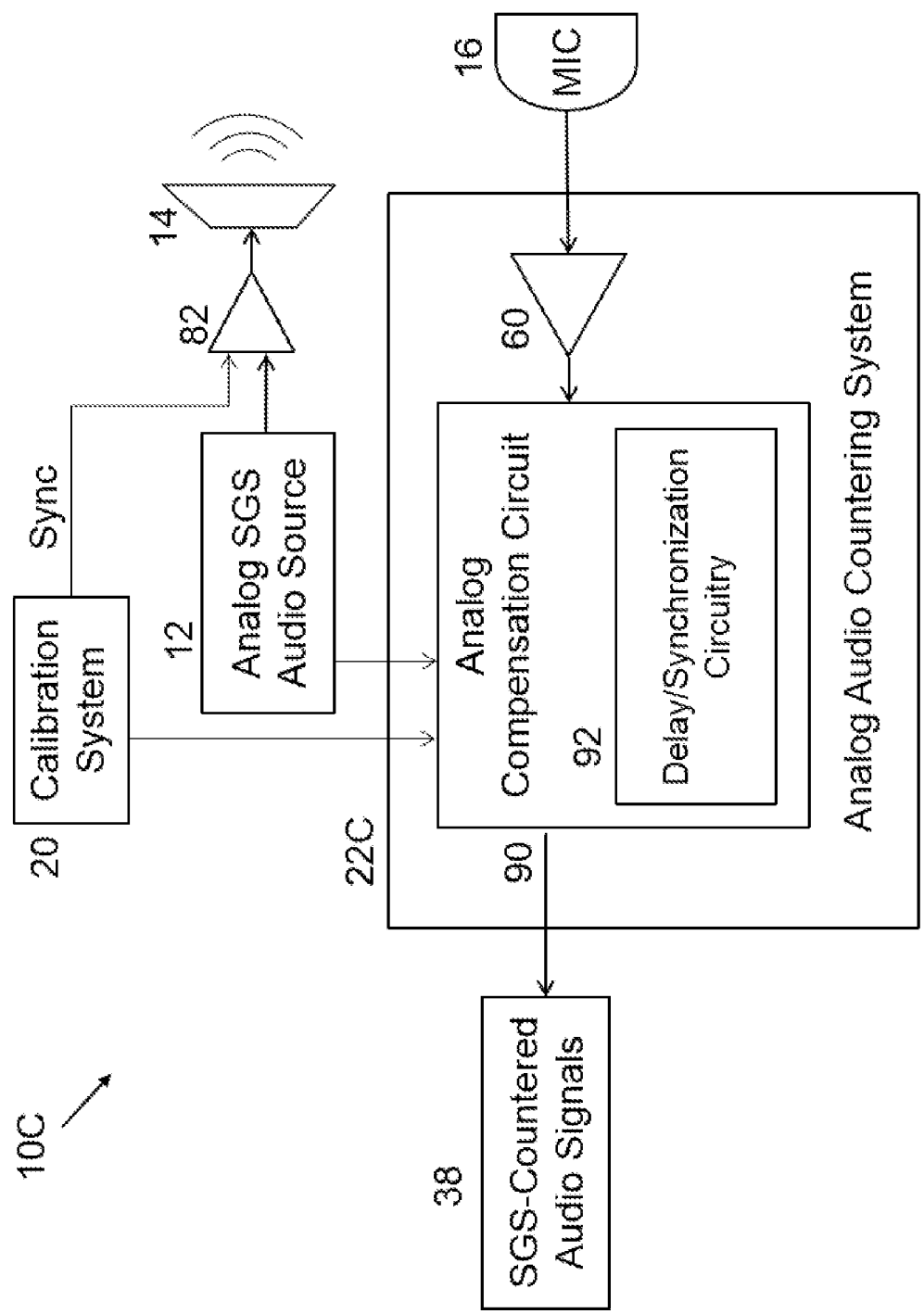
FIG. 4 illustrates an example sound compensation system for an analog voice-controllable sound generating system, according to one embodiment.

FIG. 4 illustrates components of an example sound compensation system 10C for an analog voice-controllable sound generating system, according to one example embodiment of system 10 shown in FIG. 1. System 10C may include an analog SGS audio source 12 configured to output analog SGS audio signals 30 for output via speaker(s) 14, e.g., after passing through an amplifier 82. In addition, analog SGS audio source 12 may communicate the same analog SGS audio signals 30 to an analog audio countering system 22C, which uses the analog SGS audio signals 30 to counter (distorted and time-shifted) analog audio signals received via microphone 16, e.g., as discussed above regarding FIG. 1.

System 10C may include a calibration system 20 configured to generate and output synchronization or calibration signals 42, e.g., at defined intervals or based on defined triggering events. In the illustrated example, calibration system 20 outputs synchronization ("sync") signals 42 via the same speaker(s) 14 as the audio from analog SGS audio source 12. Synch signals 42 may include any sound signals (within or outside the typical human-audible frequency spectrum) that can be detected by microphone 16 and identified by DSP 70.

Analog audio countering system 22C may include an amplifier 60 and an analog compensation circuit 90. Analog audio countering system 22C may be configured to receive (a) analog SGS audio signals 30 from analog SGS audio source 12 and (b) analog microphone-processed audio signals 36 received via microphone 16, e.g., after passing through amplifier 60. Microphone-processed audio signals 36 may include audio signals originating from various sources and distorted by various distortion factors 40, as discussed above regarding FIG. 1. For example, microphone-processed audio signals 36 may include combination of (a) distorted SGS-based audio signals 32 corresponding with analog SGS audio signals 30, (b) distorted sync signals 48 corresponding with synch signals 42, and/or (c) additional audio signals 34 including voice-based sound signals.

Analog audio countering system 22C may use analog SGS audio signals 30, which may be time-shifted or synchronized based on received sync signals 48, to counter the distorted SGS-based audio signals 32 within the combined audio signal 36 received from microphone 16, to generate SGS-countered audio signals 38, which may substantially isolate or enhance any voice-based audio signals received via microphone 16. Analog compensation circuit 90 may include any suitable delay/synchronization circuitry for time-shifting (delaying) the application of analog SGS audio signals 30 received from analog SGS sound source 12 to cancel/counter the corresponding (later-received) distorted SGS-based audio signals 32 received via microphone 16, e.g., using a time delay based on the determined delay between sync signals 42 generated by calibration source 20 and the resulting distorted sync signals 48 received via microphone 16.

Figure 5:
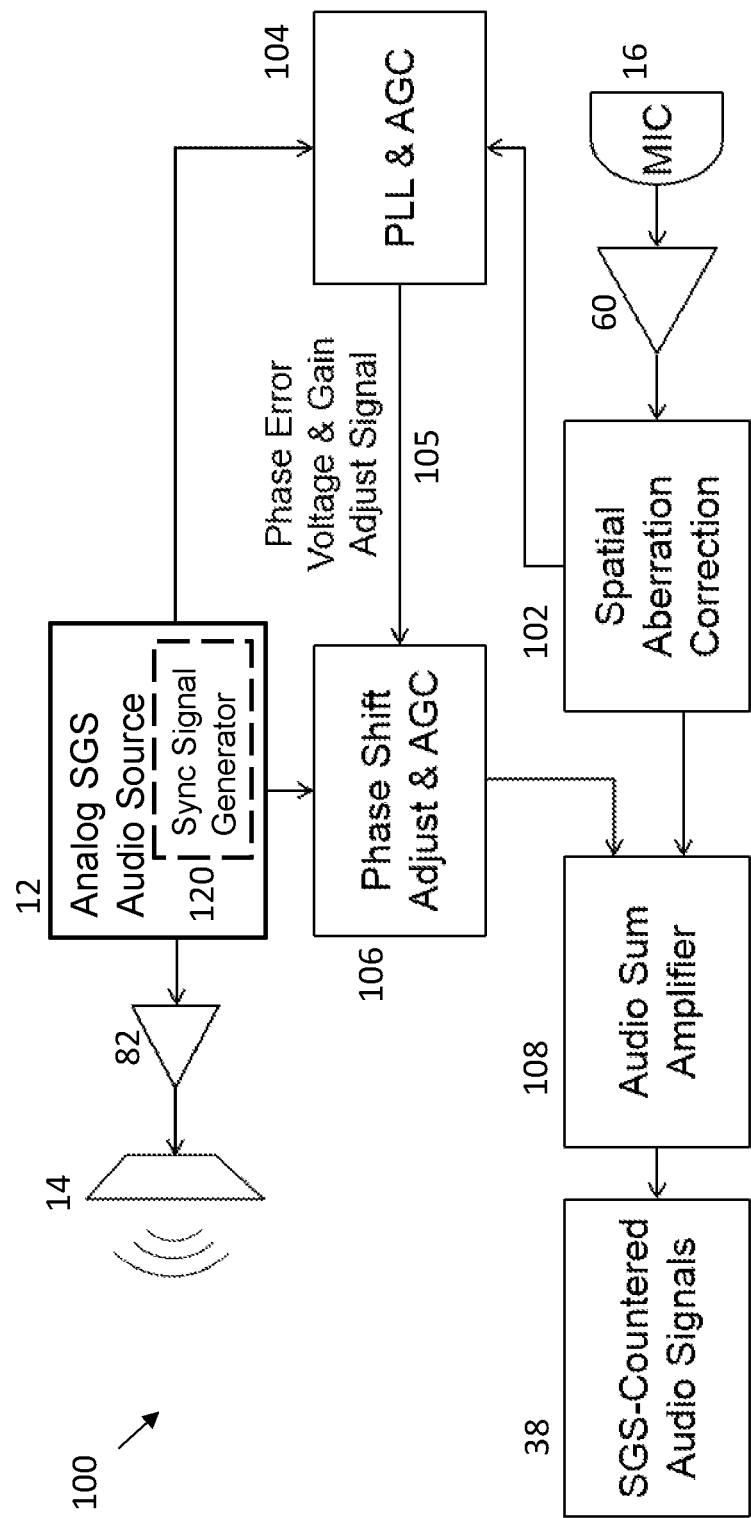
FIG. 5 illustrates an example system for synchronizing sound cancelling/countering signals for an analog voice-controllable sound generating system, according to one embodiment.

FIG. 5 illustrates an example system 100 for synchronizing sound cancelling/countering signals for an analog voice-controllable sound generating system, e.g., for use in system 10C shown in FIG. 4, according to one embodiment. System 100 may include the previously discussed components of microphone 16, amplifier 60, and analog SGS audio source 12, along with spatial aberration correction electronics 102, PLL (phase locked loop) and AGC (acoustic gain control) electronics 104, phase shift adjust and AGC electronics 106, and an audio sum amplifier 108.

As shown in FIG. 5, analog SGS audio source 12 outputs analog SGS audio signals to both (a) speaker(s) 14 and (b) the sound countering system, in particular to (i) phase shift adjust and AGC electronics 106 and (ii) PLL and AGC electronics 104. Microphone 16 receives sound waves (originated from the SGS audio signals, any voice-based signals, and/or other audio sources) and generate corresponding analog audio signals, which are passed through amplifier 60 and then processed by spatial aberration correction electronics 102. The spatial-aberration-corrected signals are then passed to both (a) PLL and AGC electronics 104 and (b) audio sum amplifier 108.

As shown, PLL and AGC electronics 104 receives (a) analog SGS audio signals from analog SGS audio source 12 and (b) microphone-received and spatial-aberration-corrected signals from spatial aberration correction electronics 102, and process such signals to generate phase error voltage and gain adjust signals 105, which are passed to phase shift adjust and AGC electronics 106. Phase shift adjust and AGC electronics 106 phase-shifts the analog SGS audio signals received from analog SGS audio source 12 based on the phase error voltage and gain adjust signals 105 received from PLL and AGC electronics 104, and forwards the phase-shifted SGS audio signals to audio sum amplifier 108.

Audio sum amplifier 108 sums (a) the microphone-received signals received from spatial aberration correction electronics 102 with (b) the phase-shifted SGS audio signals received from phase shift adjust and AGC electronics 106, which cancels or counters the portion of the microphone-received signals corresponding with the SGS audio signals output via speaker(s) 14 and received via microphone 16, to thereby enhance the remaining portions of the microphone-received signals, e.g., including voice-based signals. Thus, the resulting SGS-countered audio signals 38 may enhance any voice commands included in the microphone-received signals, and these enhanced signals 38 may then be passed to a voice control system 24 for processing.

In some embodiments, a synchronization signal can be used to create the PPL error voltage and gain control signals 105. For example, analog SGS audio source 12 may include a synchronization signals generator 120 configured to generate and output synchronizations signals. Further, in some embodiments, the spatial aberration correction electronics 102 may be omitted, thus providing a fully analog system.

Figure 6:
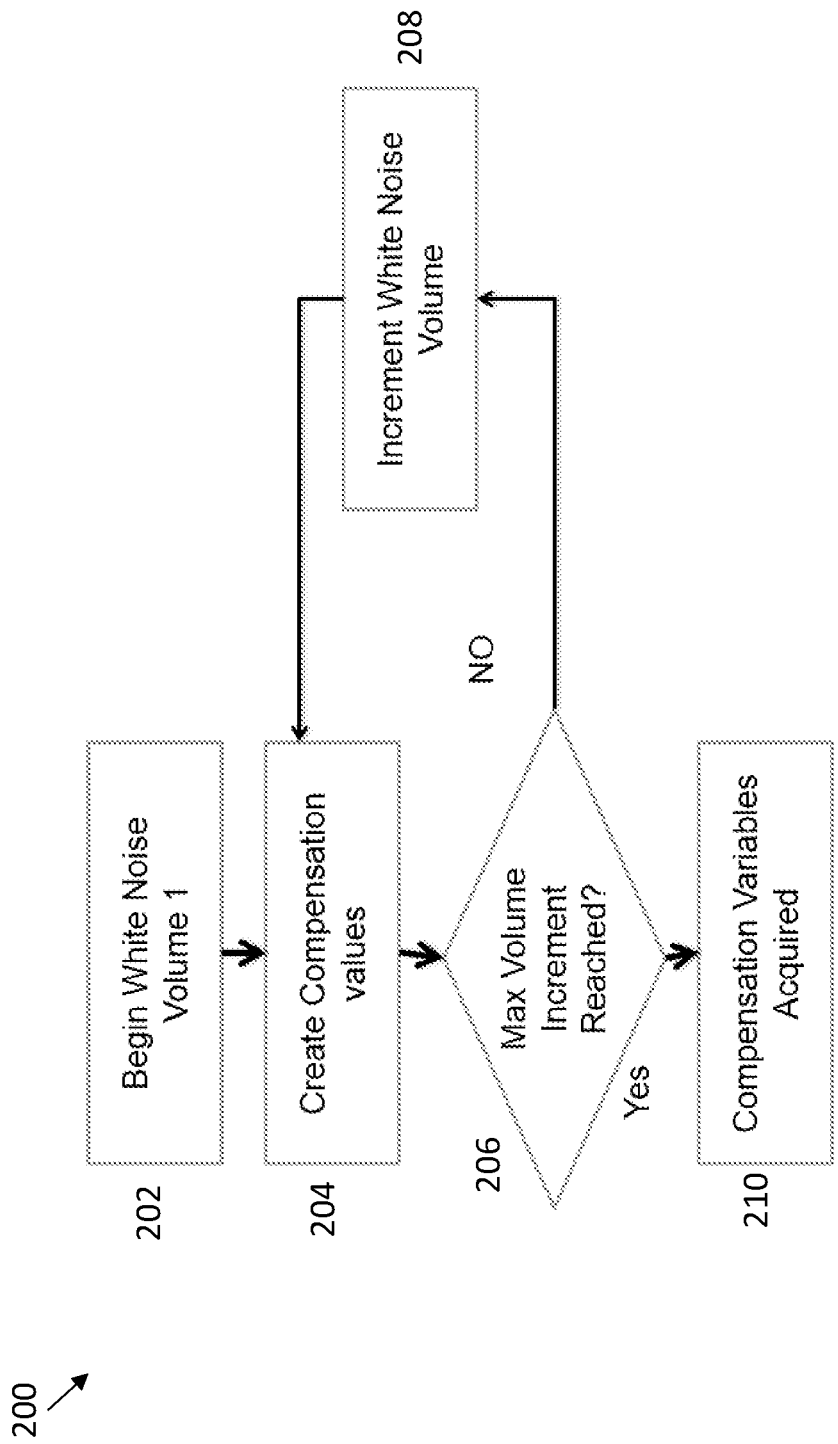
FIG. 6 illustrates an example method for calibrating a sound compensation system to compensate for acoustic distortion factors, according to one embodiment.

FIG. 6 illustrates an example method 200 for calibrating a sound compensation system to compensate for acoustic distortion factors, according to one embodiment. In some embodiments, method 200 may be implemented by calibration system 20 shown in FIGS. 1-3, for example. With reference to FIG. 1, at 202 calibration system 20 may output calibration signals 42 via speaker(s) 14 at a first (e.g., low) volume. In one embodiment the calibration signals 42 may comprise white noise signals. At 204, calibration system 20 may receive and analyze distorted calibration audio signals 48 via microphone 16 and determine compensation values representing the distortion of the received audio signals, e.g., as imparted by any distortion factors 40.

At 206, calibration system 20 may determine whether a predefined maximum volume for the calibration signals has been reached. If not, as indicated at 208, calibration system 20 may output calibration signals 42 via speaker(s) 14 at a next (e.g., higher) volume level, and determine resulting compensation values based on distorted calibration audio signals 48 received via microphone 16. When calibration system 20 determines at 206 that the predefined maximum volume for the calibration signals has been reached, all compensation values are acquired and the method may end, as indicated at 210.

The invention claimed is:

1. A system for enhanced processing of voice-based signals in a voice-controllable sound-generating system (SGS), the system comprising:
    an SGS audio source configured to, during a period of system-based audio output, communicate electronic SGS audio signals to both (a) one or more speakers for outputting SGS sound waves corresponding with the electronic SGS audio source and (b) an audio countering system;
    the audio countering system configured to:
        receive the electronic SGS audio signals from the SGS audio source;
        receive audio signals representing sound waves detected by a microphone and including:
            (a) SGS-based signals corresponding with the SGS sound waves output by the one or more speakers; and
            (b) additional audio signals resulting from sound waves originated from one or more sources other than the SGS audio source, including voice-based signals including a voice command from a human;
        use the electronic SGS audio signals received from the SGS audio source to generate SGS-countered audio signals that cancel or counter the SGS-based signals, to thereby diminish sounds produced by the SGS audio source and thereby enhance the additional audio signals including the voice command; and
    a voice-control system configured to:
        receive from the audio countering system the SGS-countered audio signals that diminish sounds produced by the SGS audio source;
        identify the voice command from the SGS-countered audio signals; and
        control at least one function associated with the SGS based on the voice command identified from the SGS-countered audio signals.

2. The system of claim 1, further comprising a calibration system to:
    communicate electronic calibration signals for output by the one or more speakers as calibration sound waves;
    receive calibration audio signals including distorted calibration audio signals corresponding with the electronic calibration signals output by the one or more speakers as calibration sound waves; and
    determine calibration data based on (a) the electronic calibration signals and (b) the distorted calibration audio signals.

3. The system of claim 2, wherein the audio countering system is configured to:
    receive the calibration data from the calibration system;
    use the calibration data to calibrate the electronic SGS audio signals communicated by the SGS audio source to define calibrated electronic SGS audio signals;
    use the calibrated electronic SGS audio signals to counter the SGS-based signals to generate the SGS-countered audio signals.

4. The system of claim 2, wherein:
    the SGS-based signals represent a distorted version of the electronic SGS audio signals, resulting from the influence of distortion factors acting at least on the SGS sound waves output by the one or more speakers; and
    the calibration data characterizes the influence of distortion factors.

5. The system of claim 2, wherein the audio calibration period occurs during the period of system-based audio output.

6. The system of claim 2, wherein the audio calibration period occurs separate from the period of system-based audio output.

7. The system of claim 1, wherein the electronic SGS audio signals communicated by the SGS audio source comprise digital SGS audio signals.

8. The system of claim 7, wherein:
    the audio signals received by the audio countering system comprise digital signals; and
    the audio countering system is configured to provide digital signal processing to generate the SGS-countered audio signals.

9. The system of claim 1, wherein the electronic SGS audio signals communicated by the SGS audio source comprise analog SGS audio signals.

10. The system of claim 9, wherein:
    the audio signals received by the audio countering system comprise analog signals; and
    the audio countering system is configured to provide analog signal processing to generate the SGS-countered audio signals.

11. A method for enhanced processing of voice-based signals in a voice-controllable sound-generating system (SGS), the method comprising:
    communicating, from an SGS audio source, electronic SGS audio signals to both (a) one or more speakers for output of SGS sound waves corresponding with the electronic SGS audio signals, and (b) an audio countering system;
    receiving, at the audio countering system:
        (i) the electronic SGS audio signals communicated from the SGS audio source; and
        (i) audio signals representing sound waves detected by a microphone and including:
            (1) SGS-based signals corresponding with the SGS sound waves output by the one or more speakers; and
            (2) additional audio signals resulting from sound waves originated from one or more sources other than the SGS audio source, including voice-based signals including a voice command from a human;

processing, by the audio countering system, the electronic SGS audio signals received from the SGS audio source to generate SGS-countered audio signals that cancel or counter the SGS-based signals included in the audio signals representing sound waves detected by the microphone, to thereby diminish sounds produced by the SGS audio source and thereby enhance the additional audio signals including the voice command;

receiving, at a voice-control system, from the audio countering system, the SGS-countered audio signals;

identifying, by the voice-control system, the voice command from the SGS-countered audio signals; and controlling, by the voice-control system, at least one function associated with the SGS based on the voice command identified from the SGS-countered audio signals.

12. The method of claim 11, further comprising:
communicating electronic calibration signals for output by the one or more speakers as calibration sound waves;

receiving calibration audio signals including distorted calibration audio signals corresponding with the electronic calibration signals output by the one or more speakers as calibration sound waves; and determining, by the calibration system, calibration data based on (a) the electronic calibration signals and (b) the distorted calibration audio signals.

13. The method of claim 12, further comprising:
using the calibration data to calibrate the electronic SGS audio signals communicated by the SGS audio source, to define calibrated electronic SGS audio signals; and using the calibrated electronic SGS audio signals to counter the SGS-based signals to generate the SGS-countered audio signals.

14. The method of claim 12, wherein:
the SGS-based signals represent a distorted version of the electronic SGS audio signals, resulting from the influence of distortion factors acting at least on the SGS sound waves output by the one or more speakers; and the calibration data characterizes the influence of distortion factors.

15. The method of claim 11, wherein the electronic SGS audio signals communicated by the SGS audio source comprise digital SGS audio signals.

16. The method of claim 15, wherein:
the received audio signals representing sound waves detected by the microphone comprise digital signals; and the audio countering system performs digital signal processing to generate the SGS-countered audio signals.

17. The method of claim 11, wherein the electronic SGS audio signals communicated by the SGS audio source comprise analog SGS audio signals.

18. The method of claim 17, wherein:
the received audio signals representing sound waves detected by the microphone comprise analog signals; and the audio countering system performs analog signal processing to generate the SGS-countered audio signals.

19. A system for enhanced processing of voice-based signals in a voice-controllable sound-generating system (SGS), the system comprising:

an SGS audio source configured to, during a period of system-based audio output, communicate electronic SGS audio signals to both (a) one or more speakers for outputting SGS sound waves corresponding with the electronic SGS audio source and (b) an audio countering system;

the audio countering system configured to:
  receive the electronic SGS audio signals from the SGS audio source; and
  receive audio signals from a microphone, the received audio signals including:
    (i) SGS-based signals corresponding with the SGS sound waves output by the one or more speakers; and
    (ii) additional audio signals resulting from sound waves originated from one or more sources other than the SGS audio source, including voice-based signals including a voice command from a human;
  use the electronic SGS audio signals received from the SGS audio source to generate SGS-countered audio signals that cancel or counter the SGS-based signals included in the audio signals received from the microphone, to thereby diminish sounds produced by the SGS audio source and thereby enhance the voice command; and a voice-control system configured to:
  receive from the audio countering system the SGS-countered audio signals that diminish sounds produced by the SGS audio source;
  identify the voice command from the SGS-countered audio signals; and
  control at least one function associated with the SGS based on the voice command identified from the SGS-countered audio signals.

20. The system of claim 19, wherein:
the electronic SGS audio signals communicated by the SGS audio source comprise digital SGS audio signals;

the audio signals received from the microphone comprise digital signals; and the audio countering system is configured to provide digital signal processing to generate the SGS-countered audio signals.

* * * * *